(12) United States Patent
Delville et al.

(10) Patent No.: US 8,743,350 B2
(45) Date of Patent: Jun. 3, 2014

(54) MEASURING DEVICE FOR CHARACTERIZING TWO-PHASE FLOWS

(75) Inventors: Jean-Pierre Delville, Talence (FR); Joël Plantard, Floirac (FR); Sébastien Cassagnere, Illats (FR); Matthieu Robert de Saint Vincent, Bordeaux (FR)

(73) Assignee: Centre National de la Recherche Scientifique, Paris (FR)

( * ) Notice: Subject to any disclaimer, the term of this patent is extended or adjusted under 35 U.S.C. 154(b) by 212 days.

(21) Appl. No.: 13/382,104

(22) PCT Filed: Jul. 1, 2010

(86) PCT No.: PCT/FR2010/000482
§ 371 (c)(1),
(2), (4) Date: Jan. 17, 2012

(87) PCT Pub. No.: WO2011/001046
PCT Pub. Date: Jan. 6, 2011

(65) Prior Publication Data
US 2012/0188531 A1   Jul. 26, 2012

(30) Foreign Application Priority Data
Jul. 3, 2009   (FR) ..................... 09 03303

(51) Int. Cl.
*G01P 3/36*   (2006.01)
(52) U.S. Cl.
USPC .......................... 356/28; 356/28.5
(58) Field of Classification Search
USPC ............. 356/3.01–3.15, 4.01–4.1, 5.01–5.15, 356/6–22, 28, 28.5
See application file for complete search history.

(56) References Cited

U.S. PATENT DOCUMENTS

| | | | |
|---|---|---|---|
| 4,516,432 A | 5/1985 | Hironaga et al. | |
| 4,659,218 A * | 4/1987 | de Lasa et al. | 356/133 |

(Continued)

FOREIGN PATENT DOCUMENTS

| | | |
|---|---|---|
| GB | 2 219 396 A | 12/1989 |
| WO | WO 2006/119106 A1 | 11/2006 |

OTHER PUBLICATIONS

Niu, X. et al., *Real-time detection, control, and sorting of microfluidic droplets*, Biomicrofluidics 1, 044101 (2007).

(Continued)

*Primary Examiner* — Luke Ratcliffe
(74) *Attorney, Agent, or Firm* — Alston & Bird LLP

(57) ABSTRACT

The invention relates to a device (1) for characterizing a two-phase flow in a channel (11), and to a related method. The device includes: a light source (10) for illuminating the channel (11), in which a fluid can flow in the form of a series of droplets in another fluid; a means (12) for detecting variations in illumination related to the passage of a drop in the channel, said detection means including at least two photodiodes (121, 122) arranged in series in the direction of the longitudinal axis of the channel (11), so that a droplet in said series of droplet flowing in the channel (11) can consecutively vary the illumination detected by the first photodiode (121) and then the illumination detected by the second photodiode (122), the photodiodes (121, 122) being reversibly mounted such that the difference in current between the electric currents of each of the two photodiodes can be determined in order to obtain a differential current representing the difference in the variation in the illumination of the photodiodes; and a processing means (19) for processing the data from the detection means (12) in order to provide data which are characteristic of the two-phase flow.

15 Claims, 9 Drawing Sheets

(56) References Cited

U.S. PATENT DOCUMENTS 5,821,528 A * 10/1998 Liao et al. .............. 250/214 R
2006/0244964 A1 11/2006 Cox et al.

OTHER PUBLICATIONS

Ward, T. et al., *Microfluidic Flow Focusing: Drop Size and Scaling in Pressure Versus Flow-Rate-Driven Pumping*, Electrophoresis 26 (2005), pp. 3716-3724.

Ward, T. et al., *Microfluidic flow focusing: Drop size and scaling in pressure versus flow-rate driven fluid pumping*, Electrophoresis 26, 3716 (2005).

International Search Report Application No. PCT/FR2010/000482 dated Aug. 18, 2010.

Written Opinion for International Application No. PCT/FR2010/000482.

Cartellier, A., *Simultaneous Void Fraction Measurement, Bubble Velocity, and Size Estimate Using a Single Optical Problem in Gas-Liquid Two-Phase Flows*, Review of Scientific Instruments 63, No. 11 (1992), pp. 5442-5453.

Engl, W. et al., *Droplet traffic at a simple junction at low capillary numbers*, Phys. Rev. Letters 95, No. 20, 208304 (2005), 4 pages.

Huebner, A. et al., *Microdroplets: A Sea of Applications?*, Lab on a Chip, 8, No. 8, (2008), pp. 1244-1254.

Leung, S. A., *Continuous real-time bubble monitoring in microchannels using refractive index detection*, Measurement Science Technology 15, No. 1, (2004) pp. 290-296.

Lim, H. et al., *Bubble Velocity, Diameter, and Void Fraction Measurements in a Multiphase Flow Using Fiber Optic Reflectometer*, Review of Scientific Instruments 79, No. 12, 125105 (2008), 11 pages.

Nguyen, N. T. et al., *Optical detection for droplet size control in microfluidic droplet-based analysis systems*, Sensors and Actuators B 117, No. 2, (2006), pp. 431-436.

* cited by examiner

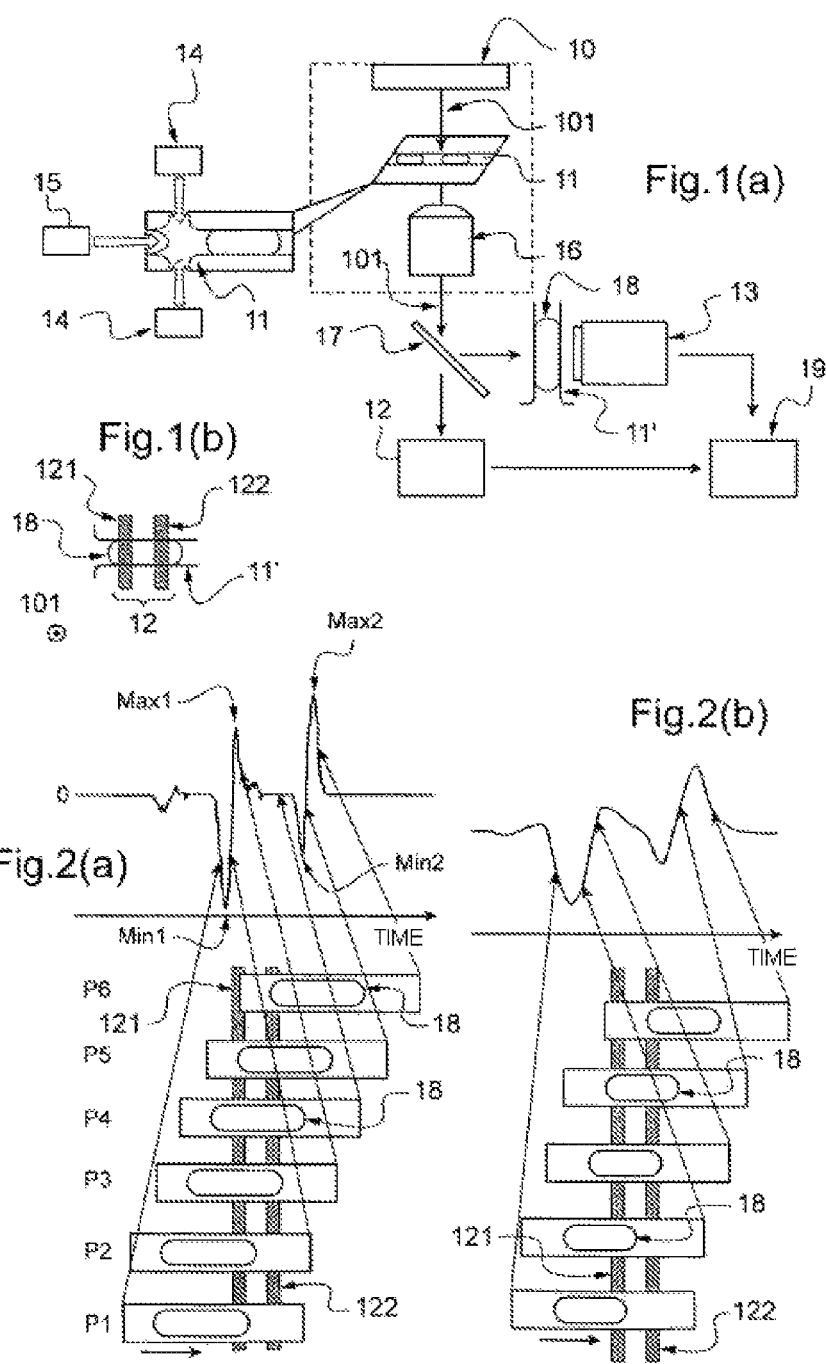

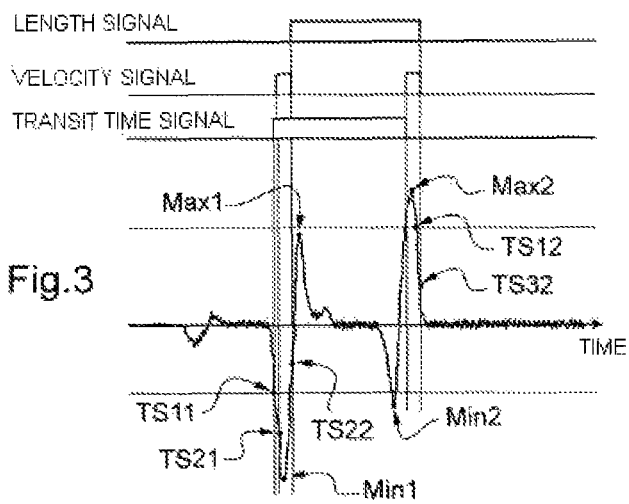
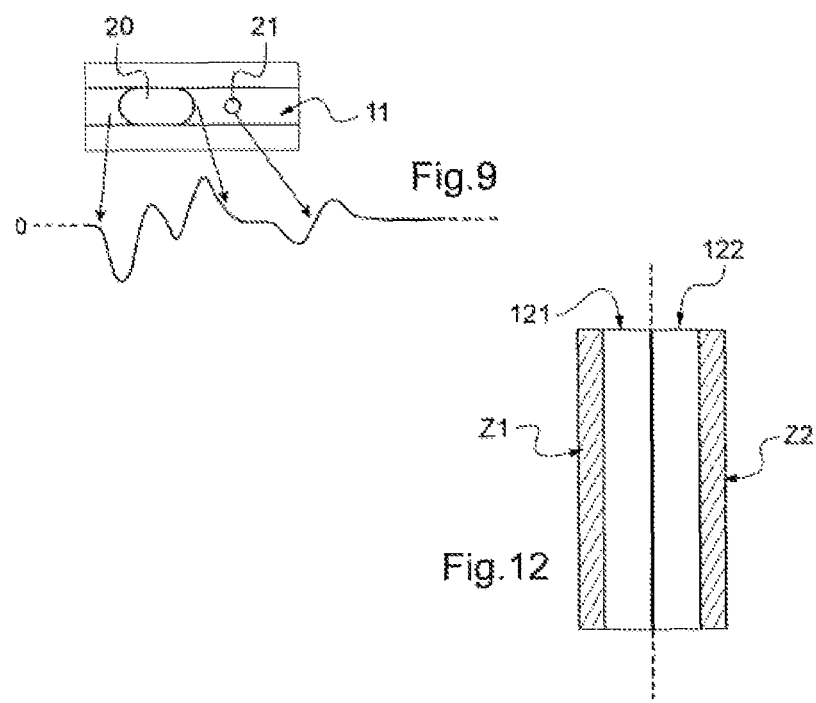

MEASURING DEVICE FOR CHARACTERIZING TWO-PHASE FLOWS

FIELD OF THE INVENTION

The present invention relates to the general field of measuring devices for characterizing two-phase flows of microfluidic, or possibly millifluidic droplets or bubbles.

The invention may be especially applicable for any calibration of lab-on-a-chip digital microfluidic devices. The term "digital microfluidic device" is understood to mean a microfluidic device for manipulating discrete droplets or bubbles, in which a droplet or a bubble is considered as a digit of information.

BACKGROUND OF THE INVENTION

Measuring devices for characterizing microfluidic two-phase flows are known.

The expression "two-phase flow" is understood to mean a flow of a first fluid in another fluid, the fluids being immiscible. In this context, liquid/liquid flow may for example be provided in which the two liquids are immiscible. It is also possible in this context to provide a gas/liquid flow.

In channels such as micro channels, a two-phase flow takes the form of a liquid jet of a first fluid in another fluid or the form of a succession of droplets of the first fluid in the other fluid. In the intended application, of seeking to obtain a flow of droplets, the characterization of the two-phase flow then consists in characterizing the droplets of the first fluid by providing for example the length of each droplet, their velocity or else the transit frequency of the droplets. This remains the case in milli channels, for which the flows however have higher flow rates.

To characterize a two-phase flow of droplets or bubbles in a micro channel, certain techniques employ one or more laser beams passing through the micro channel. For example, with a laser beam and in the case of a liquid/liquid flow, it is possible to determine the frequency of emission of droplets of a first liquid in the flow of the other liquid. Moreover, with two laser beams illuminating the micro channel at two different places along the latter, it is also possible to determine the average flow velocity of the droplets of the first liquid in the micro channel.

However, the known devices using a laser beam do not allow the size of the droplets to be determined, the measurement of this size remaining qualitative. Moreover, they can be used only for micro channels that are transparent to the laser beam.

The reader may take note of this technique in the article by W. Engl et al., "Droplet traffic at a simple junction at low capillary numbers", Phys. Rev. Letters 95, 208304 (2005).

Other techniques employ methods based on the refractive properties of a droplet of a first liquid flowing in another liquid. For this purpose, such devices emit a light beam along the direction of the micro channel and provide a position detector on the other side of the channel. By knowing the deviation of the beam it is then possible to determine the emission frequency and the size of the droplets.

However, these techniques do not enable the flow velocity of the droplets to be determined. In addition, they require a good refractive index contrast between the two fluids propagating in the micro channel.

The reader may refer to the article by S. A. Leung "Continuous real-time bubble monitoring in microchannels using refractive index detection", Measurement Science Technology 15, 290 (2004).

The abovementioned techniques therefore do not provide complete information for characterizing the flow.

Several alternative techniques make it possible to obtain more complete data about the droplets or bubbles, especially the size of the droplets, their transit frequency and their flow velocity.

This is for example the case of techniques employing what is called a "capacitive" approach. These techniques make it possible to measure a variation in capacitance due, in the case of a liquid/liquid two-phase flow, to the transit of a droplet of the first liquid in the flow of the other liquid.

However, these techniques require specific micro channels having capacitive sensors. Moreover, they are no longer effective for very small liquid droplets, the variation in capacitance becoming difficult to detect.

The reader may also refer to the article by X. Niu et al., "Real-time detection, control, and sorting of microfluidic droplets", Biomicrofluidics 1, 044101 (2007) for better understanding the capacitive technique.

This is also the case for techniques based on fiber-optic sensors in the micro channels. In the case of a liquid/liquid flow, these techniques effectively enable the emission frequency of liquid droplets, the flow velocity thereof in the other liquid and the size thereof to be determined.

The techniques based on the use of fiber-optic sensors also require specific micro channels having said sensors.

The reader may for example refer to the article by N. T. Nguyen et al., "Optical detection for droplet size control in microfluidic droplet-based analysis systems", Sensors and Actuators B 117, 431 (2006) which employs micro channels with fiber-optic sensors.

The most commonly used technique for obtaining complete data consists in using a high-speed video camera for taking images that allows the change in the two-phase flow to be monitored. For example, in the case of a liquid/liquid flow, the video technique makes it possible to measure the size, the velocity and the emission frequency of a droplet of the first liquid in the other liquid.

In addition, the video technique does not need to employ specific micro channels having capacitive or fiber-optic sensors, and therefore can be employed with basic micro channels.

However, the video technique does not make it possible to take measurements in real time since the acquisition images are firstly recorded in a memory and then analyzed by suitable software. The video images taken also consume a large amount of memory space, thereby considerably limiting the capability of tracking the two-phase flow over the course of time.

The reader may for example refer to the article by T. Ward et al., "Microfluidic flow focusing: Drop size and scaling in pressure versus flow-rate driven fluid pumping", Electrophoresis 26, 3716 (2005).

SUMMARY OF THE INVENTION

One objective of the invention is to provide a measuring device for completely characterizing a microfluidic or possibly millifluidic, two-phase flow, which does not employ specific micro channels having sensors, but here enables measurements to be taken in real time, with no limitation in acquisition time.

To achieve this objective, the invention relates to a device for characterizing a two-phase flow in a channel, characterized in that it comprises:

a light source intended to illuminate the channel in which a fluid can flow in the form of a succession of droplets in another fluid;

a means for detecting variations in illumination that are due to the transit of a droplet in the channel, said detection means comprising at least two photodiodes placed in series along the direction of the longitudinal axis of the channel so that a droplet in said succession of droplets flowing in the channel can cause the illumination detected by the first photodiode and then the illumination detected by the second photodiode to vary in succession; and a processing means for processing the data output by the detection means in order to deliver data characteristic of the two-phase flow.

The device may be provided with other technical features of the invention, taken individually or in combination:

it comprises an optical means placed between the channel and the photodiodes;

the optical means is an optical magnification means;

the photodiodes are identical;

the photodiodes are connected in reverse;

the processing means comprises means for converting a differential current corresponding to the difference between the currents output by the photodiodes, which is for example between a few nanoamps and a few tens of nanoamps, into a voltage signal, for example a voltage between a few tens of millivolts and a few hundred millivolts; and means for amplifying, for example by a factor of about 10, the voltage signal output by the current-voltage conversion means;

the processing means comprises an analog/digital conversion means for converting a voltage signal thus representative of the variations in illumination due to the transit of a droplet in the channel in order to extract at least a transit time for this droplet between the photodiodes on the basis of thresholds dependent on at least one extremum of said voltage signal; and the device comprises means for supplying the channel with two immiscible fluids.

The invention also relates to a method of characterizing a two-phase flow in a channel, characterized in that:

(a) at least one channel in which a fluid capable of flowing in the form of a succession of droplets in another fluid is illuminated;

(b) variations in illumination on a detection means, comprising at least two photodiodes placed in series along the direction of the longitudinal axis of the channel, are detected; and (c) the data from step (b) is processed in order to deliver the data characteristic of the two-phase flow.

The method may furthermore be provided with one or more of the following steps:

step (c) comprises steps for measuring a time interval associated with the transit of a droplet of the two-phase flow past the detection means, consisting in:

($c_1$) measuring the extrema (Min1, Max2) of a voltage signal representative of the change in the variations in illumination of the photodiodes which is obtained for a droplet preceding the droplet whose transit time it is desired to determine;

($c_2$) starting a time measurement when the value of the voltage signal obtained for the droplet that it is desired to characterize reaches a threshold ($T_{S11}$, $T_{S21}$, $T_{S22}$, $T_{S12}$) dependent on one of the extrema (Min1, Max2) measured for the preceding droplet; and ($c_3$) stopping this time measurement when the value of the voltage signal obtained for the droplet that it is desired to characterize reaches another threshold ($T_{S12}$, $T_{S22}$, $T_{S32}$) dependent on one of the extrema (Min1, Max2) measured for the preceding droplet;

steps are provided, for determining the velocity $V_n$ of the droplet, which consist in:

carrying out steps ($c_1$) to ($c_3$) for measuring the transit time of the droplet between the two photodiodes, in which:

step ($c_2$) consists in starting the measurement when the value of the voltage signal obtained for the droplet whose transit time between the two photodiodes it is desired to determine reaches a threshold called the third threshold ($T_{S21}$) dependent on the minimum Min1 measured for the preceding droplet and step ($c_3$) consists in stopping this measurement when the value of the voltage signal for the droplet whose transit time between the two photodiodes it is desired to determine reaches a threshold called the fourth threshold ($T_{S22}$) which is also dependent on the minimum Min1 measured for the preceding droplet; and calculating the velocity $V_n$ of the droplet by dividing the distance separating the two photodiodes by the transit time measured in the preceding step, this distance being optionally divided by the magnification factor of the optical magnification means when said means is employed;

steps are provided, for determining the velocity $V_n$ of the droplet, which consist in:

carrying out steps ($c_1$) to ($c_3$) for measuring the transit time of the droplet between the two photodiodes, in which:

step ($c_2$) consists in starting the measurement when the value of the voltage signal obtained for the droplet whose transit time it is desired to determine reaches a threshold called the second threshold ($T_{S12}$) dependent on the maximum Max2 measured for the preceding droplet and step ($c_3$) consists in stopping this measurement when the value of the voltage signal for the droplet whose transit time it is desired to determine reaches a threshold called the fifth threshold ($T_{S22}$) which is also dependent on the maximum Max2 measured for the preceding droplet; and calculating the velocity $V_n$ of the droplet by dividing the distance separating the two photodiodes by the transit time measured in the preceding step, this distance being optionally divided by the magnification factor of the optical magnification means when said means is employed;

steps are provided, for determining the length $L_n$ of the droplet, which consist in:

carrying out steps ($c_1$) to ($c_3$) for measuring a time interval $t_n$ associated with the length of the droplet, in which:

step ($c_2$) consists in starting the measurement when the value of the voltage signal obtained for the droplet whose transit time it is desired to determine reaches the fourth threshold ($T_{S22}$) and step ($c_3$) consists in stopping this measurement when the value of the voltage signal for the droplet whose transit time it is desired to determine reaches the fifth threshold ($T_{332}$); and calculating the length $L_n$ of the droplet from the equation $L_n = t_n \times V_n - l_p$, where $t_n$ is the time interval measured in the preceding step, $V_n$ is the velocity of the droplet, measured beforehand, and $l_p$ is the width of a photodiode, optionally divided by the magnification factor of the optical magnification means when said means is employed;

steps are provided, for determining the length $L_n$ of the droplet, which consist in:

carrying out steps ($c_1$) to ($c_3$) for measuring a time interval $t_n$ associated with the length of the droplet, in which:

step ($c_2$) consists in starting the measurement when the value of the voltage signal obtained for the droplet whose transit time it is desired to determine reaches the fourth threshold ($T_{S22}$) and step ($c_3$) consists in stopping this measurement when the value of the voltage signal for the droplet whose transit time it is desired to determine reaches the second threshold ($T_{S12}$); and calculating the length $L_n$ of the droplet from the equation $L_n=t_n \times V_n-(l_p-C)$, where $t_n$ is the time interval measured in the preceding step; $V_n$ is the velocity of the droplet, measured beforehand; $l_p$ is the width of a photodiode, optionally divided by the magnification factor of the optical magnification means when said means is employed; and C is a strictly positive corrective factor; and the method may furthermore be provided with the steps consisting in:

subtracting the electrical currents coming from each of the two photodiodes in order to obtain a differential current;

converting the differential current thus obtained into a voltage representative of the change in the illumination of the photodiodes; and amplifying said voltage.

BRIEF DESCRIPTION OF THE DRAWINGS

Other features, aims and advantages of the invention will be mentioned in the detailed description given below with reference to the following figures:

FIG. 1, which comprises FIGS. 1(a) and 1(b), is a schematic representation of a device for characterizing the two-phase flow in a micro channel according to the invention;

FIG. 2 shows an output signal from the device of FIG. 1 obtained by the transit of a water droplet in a hexadecane flow, and FIG. 2(a) relates to a long droplet and FIG. 2(b) relates to a short droplet;

FIG. 3 shows the method of characterization employed for extracting data about the water droplet of FIG. 2 from the output signal of the device;

FIG. 9 shows an output signal from the device of FIG. 1 obtained by the transit of a main water droplet accompanied by a smaller, secondary water droplet in a hexadecane flow;

FIG. 12 shows an example of a detection means employed in the device of FIG. 1.

Figure 4:
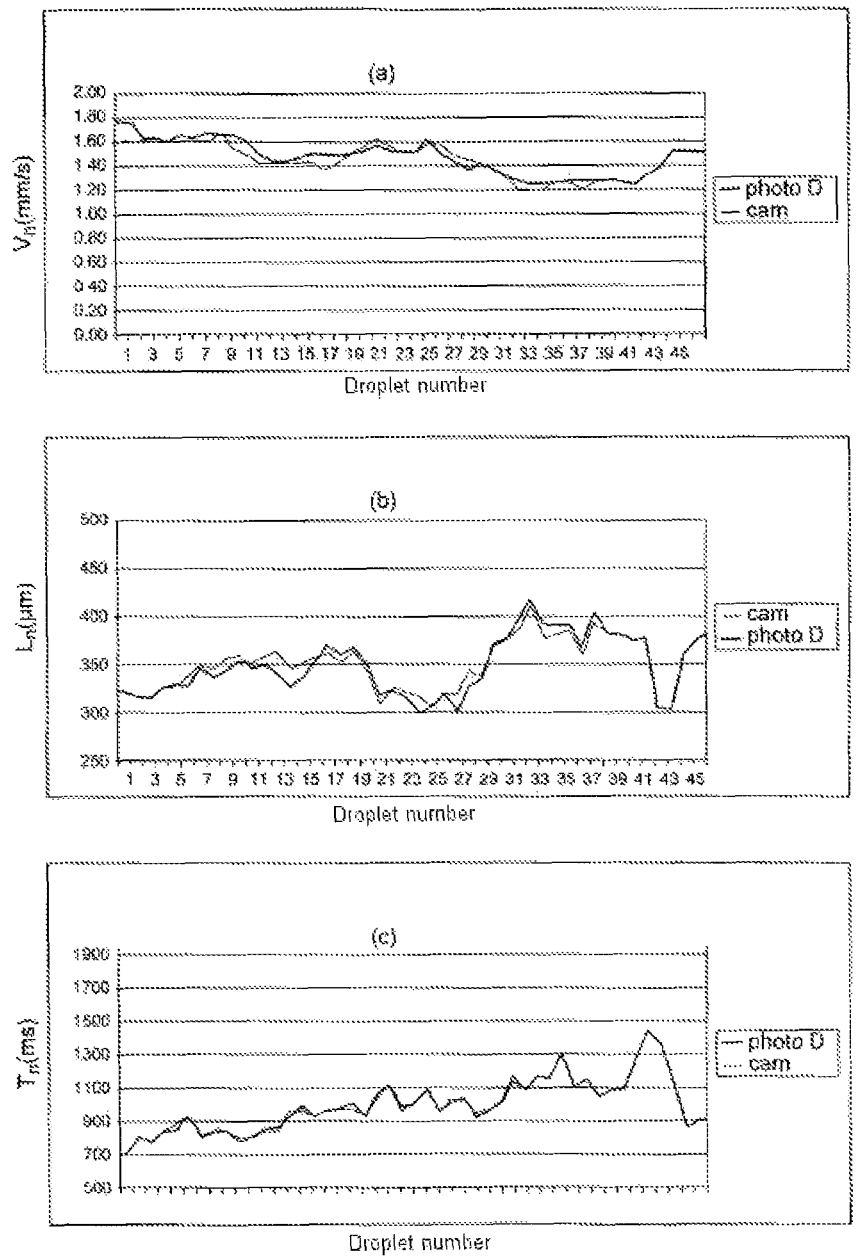
FIGS. 4 to 6 show experimental results obtained with the device of FIG. 1 for a flow of water droplets in hexadecane with low, intermediate and high flow rates.

The results presented in the following description supported by the appended figures were all obtained for a micro channel having a width of 100 µm and a depth of 50 µm.

A person skilled in the art will understand that all the results could also apply to channels having different micron-scale dimensions, or even to milli channels, that is to say those having dimensions ranging from 1 millimeter to a few tens of millimeters where the flow regime does not change. In the case in question, the flow must be in a laminar flow regime, that is to say one with a low Reynolds number, irrespective of the type of channel used to maintain a flow compatible with the digital microfluidic application.

More generally, in the following description the term "channel" will be used to denote either a micro channel or a milli channel.

Moreover, the term "droplet" will be used to denote either a liquid droplet for a liquid/liquid two-phase flow or a gas bubble for a gas/liquid flow.

FIG. 1 shows an experimental device for characterizing a two-phase flow in a micro channel according to the invention, suitable for making comparisons with a known technique based on taking images by a high-speed video camera.

The experimental device 1 comprises for this purpose a light source 10, preferably a white light source, intended to illuminate at least one micro channel 11 through which two immiscible fluids can flow.

The micro channel 11 is basic and includes no sensor.

DETAILED DESCRIPTION OF THE INVENTION

The light source 10 and the micro channel 11 are placed relative to each other in such a way that the micro channel 11 is illuminated over its length. More precisely, the longitudinal axis of the micro channel is perpendicular to the propagation direction 101 of the light emitted by the source 10.

The fluids are supplied with fluids by micro channel supply means comprising, in the present case, two reservoirs 14, 15, one 14 of the reservoirs containing a first liquid, namely hexadecane for all the experimental results presented hereafter, the other containing either another liquid (water or sweetened water for example) or a gas (for example argon).

The reservoirs 14, 15 may be syringes actuated by electromechanical means (not shown) for controlling the rate of fluid injection in the micro channel 11.

To modify the size of the droplets, but also to vary the rate of transit of the droplets and the flow velocity thereof, it suffices to vary the flow rate of the fluids entering the micro channel 11.

The two fluids are injected into the micro channel 11 via two separate inlets. The useful measurement zone is therefore located after these inlets.

The experimental device 1 also includes a means 12 for detecting variations in illumination due to the transit of a droplet of one of the two fluids in the flow of the other fluid within the micro channel.

This detection means 12 is placed downstream of the micro channel 11 with respect to the propagation direction of the light, represented by the arrow 101 in FIG. 1 and emitted by the light source 10.

The detection means 12 comprises two photodiodes 121, 122 which are placed in series in the direction of the longitudinal axis of the micro channel 11.

The way in which the photodiodes are positioned relative to the micro channel 11 is shown in FIG. 1(b), seen from above. For the position of the photodiodes to be more visible, the propagation direction of the light 101 is shown, this being perpendicular to the plane of FIG. 1(b).

FIG. 1(b) shows the shadow 11' of the micro channel 11, through which a droplet 18 flows, said shadow being projected onto the photodiodes 121, 122 along the propagation direction of the light 101.

The photodiodes 121, 122 lie in the same plane, which is both parallel to the longitudinal axis of the micro channel 11 and perpendicular to the propagation direction of the light 101.

The photodiodes 121, 122 are also oriented, in this plane, so that their respective light-sensitive zones are perpendicular to the longitudinal axis of the micro channel 11. In the particular case here, the photodiodes 121, 122 have a rectangular shape, the light-sensitive zone Z1, Z2 of each photodiode lying along the length of the photodiode, as shown for example in FIG. 12.

An important aspect in positioning the two photodiodes 121, 122 is that a droplet or bubble moving along the micro channel 11 can make the illumination flux detected by the photodiode 121 and then the illumination flux detected by the other photodiode 122 vary in succession. The photodiodes 121, 122 are therefore placed in series relative to the direction of the longitudinal axis of the micro channel 11.

Thus, the precise positions of the two photodiodes 121, 122 could be different.

For example, it would be conceivable for the photodiodes 121, 122 to remain within the same plane, which is both parallel to the longitudinal axis of the micro channel 11 and perpendicular to the propagation direction of the light 101, while being oriented however at an acute angle to the longitudinal axis of the micro channel 11.

It will be understood that such a solution is not however preferential as it would require determining this angle and would make the calculations longer and more complicated.

According to another example, it would also be conceivable for the plane in which the photodiodes 121, 122 lie to make an acute angle to the light propagation axis 101 and consequently another, complementary, acute angle to the longitudinal axis of the micro channel 11.

A solution of this kind is not preferential either, as it would also require longer and more complicated calculations. In addition, it would make the sharp focusing of the image of the channel on the photodiodes more difficult. The image would be sharp on one side but blurred on the other, owing to the difference in depth of field between these two sides. This would result in an additional inaccuracy in the measurements made.

In all cases, the two photodiodes remain in series relative to the longitudinal axis of the micro channel 111.

The photodiodes 121, 122 serve to convert the illumination that they receive into an electrical current, the level of which depends on the illumination flux. Consequently, the photodiodes are capable of detecting variations in the illumination flux that they receive, producing, at the outlet thereof, a current that varies with the variation of said illumination flux.

The experimental device 1 shown in FIG. 1(a) also includes an optical means 16 between the micro channel 11 and the detection means 12. Said optical means 16 makes it possible to obtain an image of the micro channel 11 on the detection means 12.

However, in placing the detection means 12 as close as possible to the micro channel 11, there could be no need for any optical means. For example, the micro channel 11 and the detection means 12 may be placed within one and the same plate. In this case, a relatively faithful image of the micro channel 11, and therefore of the microfluidic flow, may be obtained on the detection means 12.

Preferably an optical means 16 will however be used between the micro channel 11 and the detection means 12.

When an optical means 16 is provided, this may optionally perform an optical magnification of the image of the micro channel obtained on the detection means 12.

However, when the droplets are far enough apart and/or when they have dimensions greater than the distance separating the two photodiodes, a magnification is not essential.

However, magnification is beneficial if the droplets are smaller than the distance separating the photodiodes or when they follow one another too closely, at the risk of having several droplets at the same time on the photodiodes. In this case, the magnification makes it possible to obtain a shadow 11' of the micro channel 11, and therefore of the droplet 18, which is larger than the combined width of the two photodiodes 121, 122 and the spacing between them.

In all cases, the magnification makes it possible to obtain an output signal from the photodiodes that can be exploited more easily, as will be explained in greater detail later on.

To make it easier to exploit the results, it is preferred to choose identical photodiodes 121, 122. For example, for the experimental results presented in the rest of the description, the experimental device 1 comprises identical photodiodes each having a width of 250 µm, and a length of 15 mm, the sensitive width of each photodiode being about 100 µm.

However, the photodiodes 121, 122 may for example be such that they have a width of between 100 µm and 500 µm and a length of between 10 mm and 20 mm. These values are provided by way of indication—they are not critical for the invention insofar as they remain values compatible with the dimensions of the device.

Moreover, the photodiodes 121, 122 are connected in reverse. Such a reverse arrangement makes it possible to measure the difference in current between the electrical currents output by each of the two photodiodes 121, 122. This current difference is also called the differential current.

Therefore, it is possible to detect small differences in the variations in illumination between the two photodiodes 121, 122.

To do this, the device 1 is initially balanced when it detects identical illuminations on each of the two photodiodes 121, 122.

Any asymmetric variation in illumination on the two photodiodes 121, 122 therefore generates a differential current which can also be as small as a few tens of nanoamps.

The experimental device 1 includes a processing means 19 connected to the outputs of the photodiodes 121, 122 in order to process the differential current from the photodiodes.

This processing means 19 comprises a current-voltage converter (not shown) and a voltage amplifier (not shown) and also employs a program for processing the voltage thus amplified.

The current-voltage converter is a conventional one.

The voltage amplifier is also a conventional one, but it typically amplifies by a factor of between 1 and 10 in order to output a voltage of a few hundred millivolts. At this voltage level, the two photodiodes cannot however be strictly balanced, and the signal obtained as output from the amplifier is shifted, sometimes by several volts, relative to the zero level.

This is why the processing means 19 also employs the processing program to rebalance the signal about a mean value close to zero. For example, but not limitingly, this may be a simple program that detects the minima and maxima of the signal output by the amplifier and introduces a DC voltage component according to the prior detection of the signal minima and maxima.

After these various processing steps, an amplified voltage signal representative of the difference in illumination between the two photodiodes 121, 122 is obtained, the signal being centered on the zero value and the order of magnitude of which is a few hundred millivolts, or even a volt.

Such an amplified voltage signal is for example plotted in FIG. 2 as a function of time in the case of the flow of a water droplet in hexadecane.

FIG. 2 also shows the correspondence between the position of the water droplet 18 relative to the photodiodes 121, 122, and the waveform of the amplified voltage signal thus processed.

With the help of FIG. 2(a) we will now describe the flow more precisely.

In FIG. 2(a), the droplet may be termed a long droplet since its length exceeds the combined distance of the widths of the two photodiodes 121 or 122 with the spacing between the photodiodes 121, 122.

The photodiodes 121, 122 see the transit of the water droplet shown in various positions P1 to P6 with a magnification provided by the optical means 16. In the case in question, the magnification is a factor of 5.

In the position P1, the front meniscus of the water droplet goes past the first photodiode 121, which then receives less illumination from the light source 10. The negative signal having an initial negative slope observed in FIG. 2 thus corresponds to the detection of the start of the water droplet by the first photodiode 121.

The signal having a positive slope that follows, which defines the position P2 of the water droplet, corresponds to a reduction in the shadow of the front meniscus on the first photodiode 121. Specifically, the area of the front meniscus is greater than the combined area of the lateral sides of the droplet, which are in contact with the walls of the micro channel 11.

When the front meniscus of the water droplet reaches the second photodiode 122, the signal again becomes positive as far as the illumination of the second photodiode 122, onto which the front meniscus of the water droplet is projected, is lower than the illumination of the first photodiode 121 onto which only the edges of the water droplet project.

Next, in the position P3, the positive signal reverses, taking a negative slope. This corresponds to the front meniscus of the water droplet progressively moving away from the second photodiode 122.

The position P4 corresponds to a position of the water droplet in which each of the two photodiodes 121, 122 detects the reduction in illumination due to only the lateral edges of the droplet. Because each photodiode measures the same reduction in illumination, the observed voltage signal is flat and close to zero.

The position P4 is observed when the water droplet may be termed a long droplet. For a shorter droplet, the projected length of which is less than the combined distance of two widths of the photodiodes together with the spacing between the photodiodes, it is possible that this flat does not exist in the signal.

This is for example the case shown in FIG. 2(b) for which the length of the droplet 18 is shorter than that shown in FIG. 2(a), the other experimental conditions being the same.

When the rear meniscus of the water droplet goes past the photodiodes 121, 122, a complementary signal is produced which is the inverse of the signal described above in respect of the positions P1 to P3 of the water droplet.

More precisely, the position P5 corresponds to a position in which the rear meniscus of the water droplet is in front of the first photodiode 121 and moving away therefrom. A negative voltage signal is therefore observed, which is due to the reduction in the illumination of the first photodiode 121, the positive slope corresponding to the fact that the rear meniscus is starting to move away from the first photodiode 121.

Finally, the position P6 corresponds to a position in which the rear meniscus of the water droplet is past the second photodiode 122. The signal is therefore positive since the illumination of the first photodiode 121 is greater than the illumination of the second photodiode 122. The negative slope observed in the position P6 illustrated means that the rear meniscus is starting to move away from the center of the second photodiode 122.

It may be seen that the minimum Min2 observed in the voltage signal between the positions P5 and P6 has an absolute value comparable to the value of the maximum Max1 obtained between the positions P2 and P3. Likewise, it may be seen that the maximum Max2 in the voltage signal between the positions P5 and P6 has a value comparable to the absolute value of the minimum Min1 obtained between the positions P1 and P2 of the water droplet.

This is the reason why the signal obtained between the positions P5 and P6 is termed "complementary" and inverted relative to the signal described between the positions P1 and P3.

The waveform of this voltage signal is perfectly understandable given the symmetrical shape of the water droplet and the use of two identical photodiodes 121, 122.

The advantage of the optical means 16 with a magnification may also be noted. This enables the droplet to be expanded relative to the photodiodes 121, 122 and enables the voltage signal obtained to be spread over time, thereby facilitating the exploitation thereof and more precisely the analog-digital conversion that it will subsequently undergo.

This is because the voltage signal (amplification and magnification of the droplets) thus obtained makes it possible to ensure an analog-digital conversion (ADC) with good resolution over the entire range of the converter, generally between −10 V and +10 V.

Now, good resolution of this conversion is important in order for the characteristics of the two-phase flow, namely in particular the transit time of a droplet, the length and/or flow velocity thereof in the micro channel, or the droplet transit frequency, to be determined accurately.

The processing means 19 therefore further includes an analog-digital conversion means (not shown).

The digitization of the analog voltage signal may be seen in FIG. 3, which shows the same analog signal as that shown in FIG. 2(a).

The characterization of the two-phase flow consists mainly in characterizing the droplets (transit time, velocity and length).

To determine the transit time of a droplet between the two photodiodes, the following steps are provided, which consist in:

measuring the extrema Min1, Max2 of the voltage signal obtained for a droplet preceding the droplet the transit time of which it is desired to determine;

starting a counter when the voltage obtained for the droplet the transit time of which it is desired to determine reaches a first threshold ($T_{S11}$) dependent on the minimum Min1 measured for the preceding droplet; and stopping the counter when the voltage for the droplet the transit time of which it is desired to determine reaches a second threshold ($T_{S12}$) dependent on the maximum Max2 measured for the preceding droplet.

The preceding droplet adopted may for example be the immediately preceding droplet.

The first threshold $T_{S11}$ for detecting a new droplet may for example be defined by the value at which the signal reaches 50% of the minimum Min1 measured for the preceding droplet adopted.

The second threshold $T_{S12}$ is defined by the value at which the signal reaches 75% of the maximum Max2 measured for the preceding droplet adopted.

Values of the thresholds ($T_{S11}$, $T_{S12}$)=(50% of Min1, 75% of Max2) are thus chosen as they correspond to elementary values that are rapidly calculated by a microprocessor. In addition, it may be seen that the slope of the signal is steep for these values, thereby increasing the accuracy of the measurement.

Other values could be chosen for these thresholds provided however that the transit time of a droplet between the two photodiodes is long enough to obtain good precision of the measurement. For example, the transit time is a few milliseconds in trials that were carried out.

To determine the flow velocity of the droplet, steps are provided that consist in:
measuring the transit time of the droplet between the two photodiodes according to the following substeps:
measuring the extrema Min1, Max2 of the voltage signal obtained for a droplet preceding the droplet the transit time of which it is desired to determine;
starting a counter when the voltage obtained for the droplet the transit time of which it is desired to determine reaches a third threshold ($T_{S21}$) dependent on the minimum Min1 measured for the preceding droplet;
stopping the counter when the voltage for the droplet the transit time of which it is desired to determine reaches a fourth threshold ($T_{S22}$) which is also dependent on the minimum Min1 measured for the preceding droplet; and
calculating the velocity of the droplet by dividing the distance separating the two photodiodes by the transit time measured in the preceding step, this distance being possibly divided by the magnification factor of the optical magnification means when said means is employed.

The third threshold $T_{S21}$ for starting the measurement of the transit time intended for calculating the velocity of the droplet may for example be defined by the value at which the signal reaches 75% of the minimum Min1 measured for the preceding droplet adopted.

The fourth threshold $T_{S22}$ for stopping this measurement may for example be defined by the value at which the signal reaches 25% of the minimum Min1 measured for the preceding droplet adopted. As may be seen in FIG. 3, in theory there are two time values corresponding to this 25% criterion. However, to stop the counter, only the time taken after starting the counter has any physical meaning.

The distance separating the two photodiodes must therefore be known. For the experimental results presented here, this distance is 370 µm.

The distance useful for the calculations must take into account the protrusions due to the rounded shape of the front and rear menisci of the droplet. Typically, the various numerical simulations carried out using the optical signal indicate that it is necessary to remove a fixed amount of 20 µm from the distance separating the photodiodes in order to taken into account the rounded shapes of the droplet, this distance having been optionally divided beforehand by the magnification factor of the optical magnification means when said means is employed. The many tests performed then serve to corroborate this value for the device used.

A person skilled in the art will know that the distance taken into account for calculating the velocity of the droplet depends on the design of the photodiodes and does not in itself constitute a critical datum for the invention. However, it is necessary to know this spacing in order to calculate the velocity of the droplet. Moreover, this distance must theoretically have a minimum value in order for the velocity to be measured with sufficient accuracy.

In the currently available fabrication techniques, which involve a minimum spacing between the photodiodes, it turns out that no accuracy problem relating to measuring the velocity has been encountered hitherto.

Finally, to determine the length of the droplet, steps are provided that consist in:
measuring the transit time of the droplet according to the following substeps:
measuring the extrema Min1, Max2 of the voltage signal obtained for a droplet preceding the droplet the transit time of which it is desired to determine;
starting a counter when the voltage obtained for the droplet the transit time of which it is desired to determine reaches the fourth threshold ($T_{S22}$) dependent on the minimum Min1 measured for the preceding droplet;
stopping the counter when the voltage for the droplet the transit time of which it is desired to determine reaches a fifth threshold ($T_{S32}$) dependent on the maximum Max2 measured for the preceding droplet; and
calculating the length $L_n$ of the droplet according to the equation $L_n = t_n \times V_n - I_p$ where $t_n$ is the transit time measured in the preceding step, $V_n$ is the velocity of the droplet determined beforehand and $I_p$ is the width of a photodiode, possibly divided by the magnification factor of the optical magnification means when said means is employed.

The fifth threshold $T_{S32}$ may be defined by the value at which the signal reaches 25% of the maximum Max2 measured for the preceding droplet adopted. As may be seen in FIG. 3, in theory there are two time values corresponding to this criterion of 25% of the maximum. However, to stop the counter, only the time taken in the part having a negative slope has a physical meaning. This therefore is clearly the time value for which the rear meniscus of the droplet moving away from the second photodiode 122 (position P6 in FIG. 2(a)).

Here again, the value of this threshold could be different, depending on the choices made for the other thresholds $T_{S11}$, $T_{S21}$, $T_{S12}$.

Alternatively, the measurement of the propagation time intended for measuring the velocity may be carried out in another manner, by means of a measurement carried out as follows:
measuring the transit time of the droplet between the two photodiodes according to the following substeps:
starting a counter when the voltage obtained for the droplet the transit time of which it is desired to determine reaches the second threshold $T_{S12}$;
stopping the counter when the voltage for the droplet the transit time of which it is desired to determine reaches the fifth threshold $T_{S32}$; and
calculating the velocity of the droplet by dividing the distance separating the two photodiodes by the transit time measured in the preceding step, this distance possibly being divided by the magnification factor of the optical magnification means when said means is employed.

Here again, a value of 20 µm may be taken for the distance separating the two photodiodes in the calculation of the velocity.

The advantage of this single velocity measurement is that it employs thresholds used for measuring the transit time and for measuring the length of the droplet. According to this alternative, only four thresholds $T_{S11}$, $T_{S12}$, $T_{S22}$ and $T_{S32}$ are defined for obtaining the data about the transit time, the velocity of the droplet and the length thereof.

Alternatively, it is possible to make two measurements of the velocity of a droplet as above. In this case, it may be envisaged to take the arithmetic mean of the two velocity measurements in order to improve the accuracy.

Another possibility for only employing four thresholds is the following.

The transit time of the droplet is measured with the first threshold $T_{S11}$ and the second threshold $T_{S12}$, as previously. The velocity of the droplet is determined with the third threshold $T_{S21}$ and the fourth threshold $T_{S22}$, as previously, and then the length of the droplet is determined using the third threshold $T_{S22}$ and the second threshold $T_{S12}$.

To determine the length of the droplet, it is therefore unnecessary to take the fifth threshold $T_{S32}$ into account.

In this case, it is however necessary to apply a correction C to the calculation carried out, in order to determine the length of the droplet, using the equation $L_n = t_n \times V_n = (l_p - C)$. The length $l_p$ separating the two photodiodes is possibly divided by the magnification factor of the optical magnification means when said means is employed.

In the particular case here, the width of a photodiode is equal to 100 µm, the magnification factor is equal to 5 and the correction C is equal to 40 µm. The time interval $t_n$ is then measured between the third threshold $T_{S22}$ and the second threshold $T_{S12}$, which is shorter than the time interval between the third threshold $T_{S22}$ and the fifth threshold $T_{S32}$.

Whatever the method envisaged, the extrema Min1, Max2 and the associated thresholds may be measured for each droplet, the characteristics of which it is desired to determine, on the basis of the immediately preceding droplet.

Moreover, by comparing the measurements made between the immediately preceding droplet and the droplet the characteristics of which are determined it is possible to determine the frequency at which the droplets follow one another in the flow. For this purpose, it is sufficient to calculate, for example, the time interval separating the detection of the first threshold of the droplet immediately prior to the detection of the first threshold of the droplet the characteristics of which have just been determined.

All the calculations and measurements are carried out in real time and require very little memory compared with a conventional technique using a video camera.

The experimental device 1 is particularly well suited to what are called digital microfluidic applications in which droplets are flowing with a high frequency, possibly up to 1000 droplets per second (=1 kHz) in the base arrangement presented here and with a high velocity, namely typically between 1 mm/s and several cm/s. This frequency may be up to 10 to 20 kHz in an arrangement designed for measuring rapidly moving droplets.

The experimental device 1 also makes it possible to obtain complete data about the flow, namely droplet frequency, length of a droplet, flow velocity of a droplet, etc.

To obtain such complete data, the above description defines at least four thresholds ($T_{S11}$, $T_{S12}$, $T_{S22}$ and $T_{S32}$) or ($T_{S11}$, $T_{S12}$, $T_{S21}$ and $T_{S22}$) that are based on the extrema Min1, Max2 and preferably on another threshold $T_{S21}$ in order to improve the accuracy of the droplet velocity measurement and to simplify the droplet length determination.

The flow shown in FIG. 3, the voltage signal of which is analyzed in FIG. 2, corresponds to a flow regime that may be termed a simple regime, namely a regular flow with droplets of uniform dimensions.

However, the flows that can be detected in the context of the invention may be much more complex. This is because the flow may be irregular from one droplet to another, or between two successions of droplets between which there is a momentary absence of droplets. The length of the droplets may also be very different in the succession of droplets in the flow. The flow may also be chaotic.

The device and its associated processing method make it possible to access all these irregular flows that can be encountered in the field of digital microfluidics.

However, the abovementioned steps of the method may be considerably simplified in the case of regular flows.

Thus, in the case of a regular flow of droplets having identical lengths, it is preferred to calculate the extrema Min1, Max2 only once. The values thus determined are retained for all the droplets for which an acquisition of data will be obtained.

In addition, it is conceivable to make only two measurements of the droplet propagation time and then to deduce therefrom, without any other measurement, the flow velocity and the length of the droplet.

In this case, it is then sufficient merely to define three thresholds based on the extrema Min1, Max2.

For example, only the three thresholds $T_{S21}$, $T_{S22}$, $T_{S32}$ may be retained for determining the transit time of a droplet, the velocity and the length thereof.

The thresholds $T_{S21}$ and $T_{S22}$ make it possible to obtain the flow velocity in accordance with the method described above. The thresholds $T_{S22}$ and $T_{S32}$ themselves serve for measuring a transit time of the droplet and then, knowing the velocity, to determine the length of this droplet. The frequency may be determined only once by comparing two consecutive droplets relative to the same threshold, for example the threshold $T_{S21}$.

As an alternative, it is conceivable to retain only the three thresholds $T_{S22}$, $T_{S12}$ and $T_{S32}$ to determine this same data.

The use of at least four thresholds and preferably of a fifth threshold on the basis of the extrema Min1, Max2 is however necessary for more complex flows, without which it becomes difficult to obtain reliable results.

To validate the technique proposed by the invention, a high-speed video camera 13 was incorporated into the experimental device 1 shown in FIG. 1.

Specifically, the experimental device 1 includes a high-speed video camera 13, for example a CMOS camera, placed after the optical means 16 in the path of the light.

The purpose of this camera 13 is simply to make comparisons between the results provided by the photodiode-based detection means 12. However, although the camera 13 forms an integral part of the experimental device 1 it is not necessarily part of a device according to the invention.

To employ both the high-speed camera 13 and the photodiodes 121, 122 in the experimental device 1, a beam splitter 17 is provided that serves to send the light rays coming from the light source 10 and having passed through the micro channel 11 into, on the one hand, the photodiodes 121, 122 and, on the other hand, into the high-speed camera 13.

Thus, the photodiodes 121, 122 and the high-speed camera 13 analyze the same phenomena therefore making it conceivable to compare the two techniques. The shadow 11' of the micro channel through which the droplet 18 flows is in fact the same for both the photodiode sensor 12 and the camera 13.

The camera 13 is also connected to the data processing means 19, the latter comprising means dedicated to processing the video images.

The comparison between these techniques will be described in conjunction with FIGS. 4 to 8, which provide results according to various physical parameters liable to have an influence on the two-phase flow.

Figure 5:
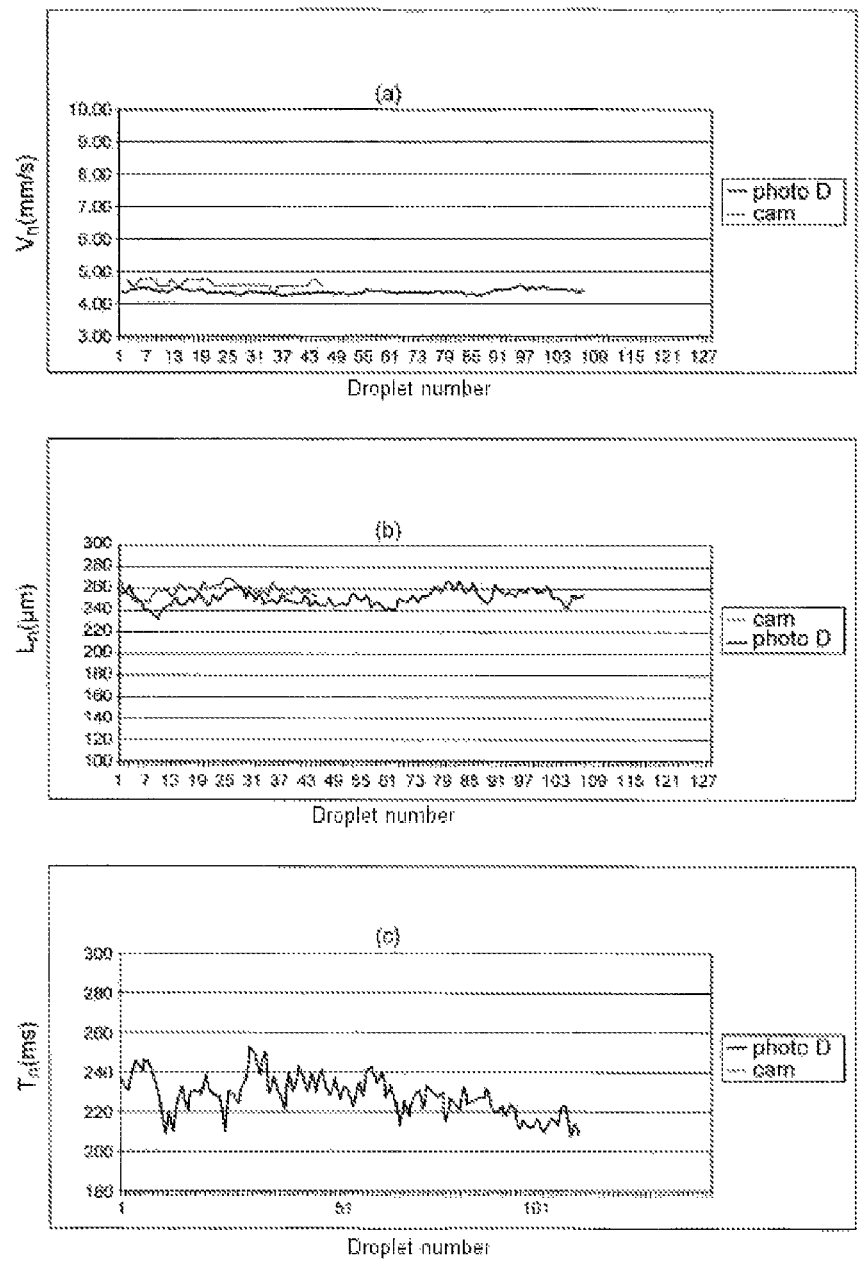
Figure 6:
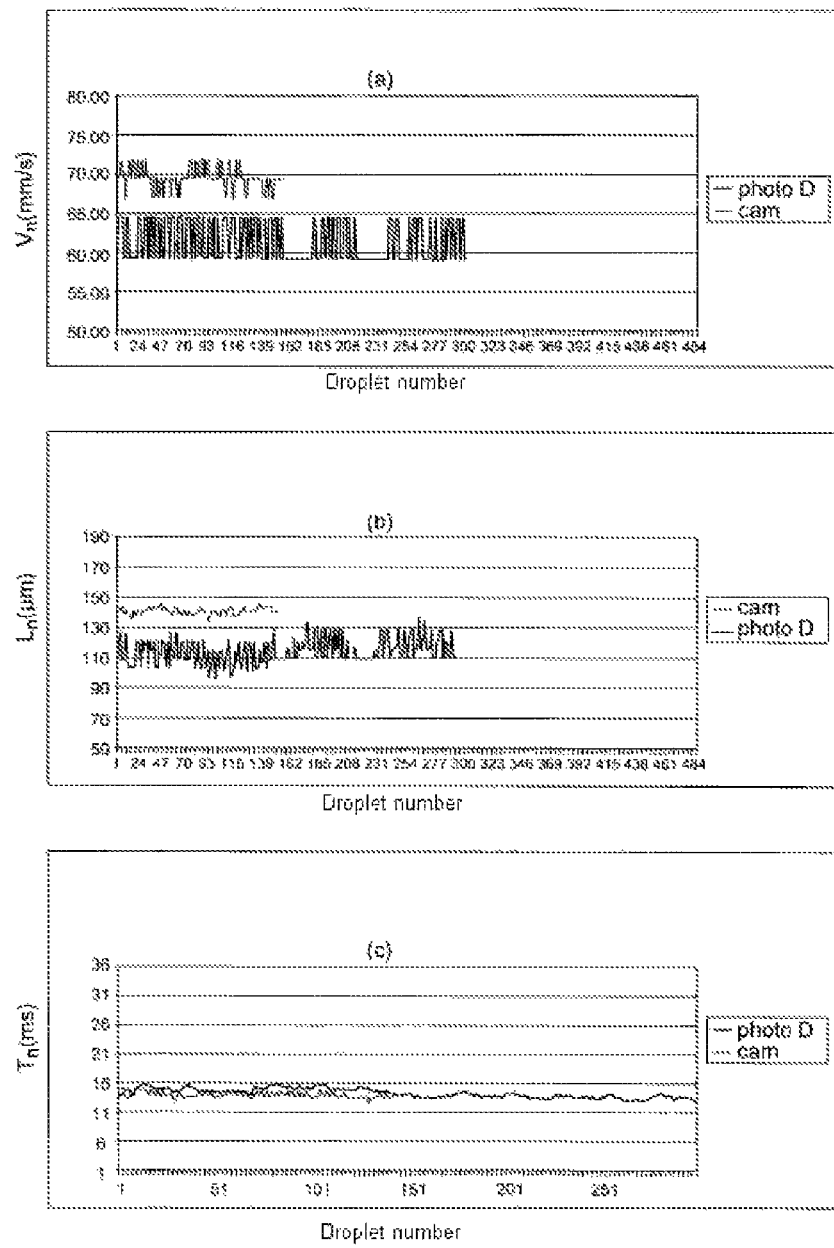

Thus, FIGS. 4 to 6 show experimental results obtained with the experimental device of FIG. 1 for a flow of water droplets in hexadecane, having a low flow rate (FIG. 4), an intermediate flow rate (FIG. 5) and a high flow rate (FIG. 6).

The difference in refractive index between hexadecane and water is 0.104.

In FIG. 4, the droplet flow rate $Q_e$ and the hexadecane flow rate $Q_h$ are 0.1 μL/min and 0.4 μL/min respectively.

FIG. 4 shows three different diagrams (a), (b) and (c) which respectively illustrate, plotted on the y-axis, the droplet velocity $V_n$, the droplet length $L_n$ and the period between two successive droplets as a function of the droplet number on the x-axis. It will be understood that diagram (c) serves to make the link between the droplet number and the elapsed time.

Other characteristics of the two-phase flow derivable from these measurements could also be presented.

It should be noted that there is a very good agreement between the measurements made by the high-speed camera 13 ("cam" signal) and the measurements made by the device according to the invention ("photoD" signal) for measuring the characteristics of the water droplet.

In FIG. 5, the droplet flow rate $Q_e$ and the hexadecane flow rate $Q_h$ are 0.4 μL/min and 1.5 μL/min respectively.

FIG. 5 also shows three different diagrams (a), (b) and (c) which respectively illustrate, plotted on the y-axis, the droplet velocity V, the droplet length $L_n$ and the period between two successive droplets as a function of the droplet number on the x-axis. It will be understood that diagram (c) serves to make the link between the droplet number and the elapsed time.

In these diagrams, it should be noted that the data taken by the camera 13 ("cam") stops at around the $45^{th}$ droplet. This is simply due to the fact that the device had no more memory available for the images acquired by the camera 13.

Again it may be seen that, for these intermediate flow rates, there is a good agreement between the measurements made by the high-speed camera 13 ("cam") and the measurements made by the device according to the invention ("photoD") for measuring the characteristics of the water droplet.

It is noted that the relative difference between the two types of measurement is greater for these intermediate flow rates than for low flow rates. However, the agreement remains totally acceptable insofar as the relative difference between the two techniques is less than 5% in the droplet velocity, droplet length and droplet transit frequency measurements.

The greater difference is due to the fact that the rear shape of the droplet is modified by the increase in flow rate. Specifically, the more the flow rate increases the more the droplet assumes the shape of a bullet. This asymmetric shape between the front and rear of the droplet causes the values measured using the technique according to the invention in the context of the experimental device to be underestimated.

This difference is considerably reduced by employing an electronic quality processing step in order to provide acceptable accuracy irrespective of the fluid flow rates.

In FIG. 6, the droplet flow rate $Q_e$ and the hexadecane flow rate $Q_h$ are 2.5 μL/min and 25 μL/min respectively.

FIG. 6 shows three different diagrams (a), (b) and (c) which respectively illustrate, plotted on the y-axis, the droplet velocity $V_n$, the droplet length $L_n$ and the period between two successive droplets as a function of the droplet number on the x-axis.

In these diagrams, it should be noted that the data taken by the camera 13 ("cam") stops at around the $140^{th}$ droplet. Again, this is simply due to the fact that the experimental device 1 no longer had memory available for the images acquired by the camera 13.

It may be seen that the measurements provided by the camera 13 and by the photodiode detection means 12 according to the invention are similar but that the relative difference between them is accentuated compared with the tests carried out at the intermediate flow rates and, even more so, relative to the tests carried out for the low flow rates.

As indicated above, this is due to the change in shape of the droplets as the flow rate increases.

Once again, it may also be seen that the values provided by the detection means 12 according to the invention underestimate the values determined by the camera 13.

Figure 7:
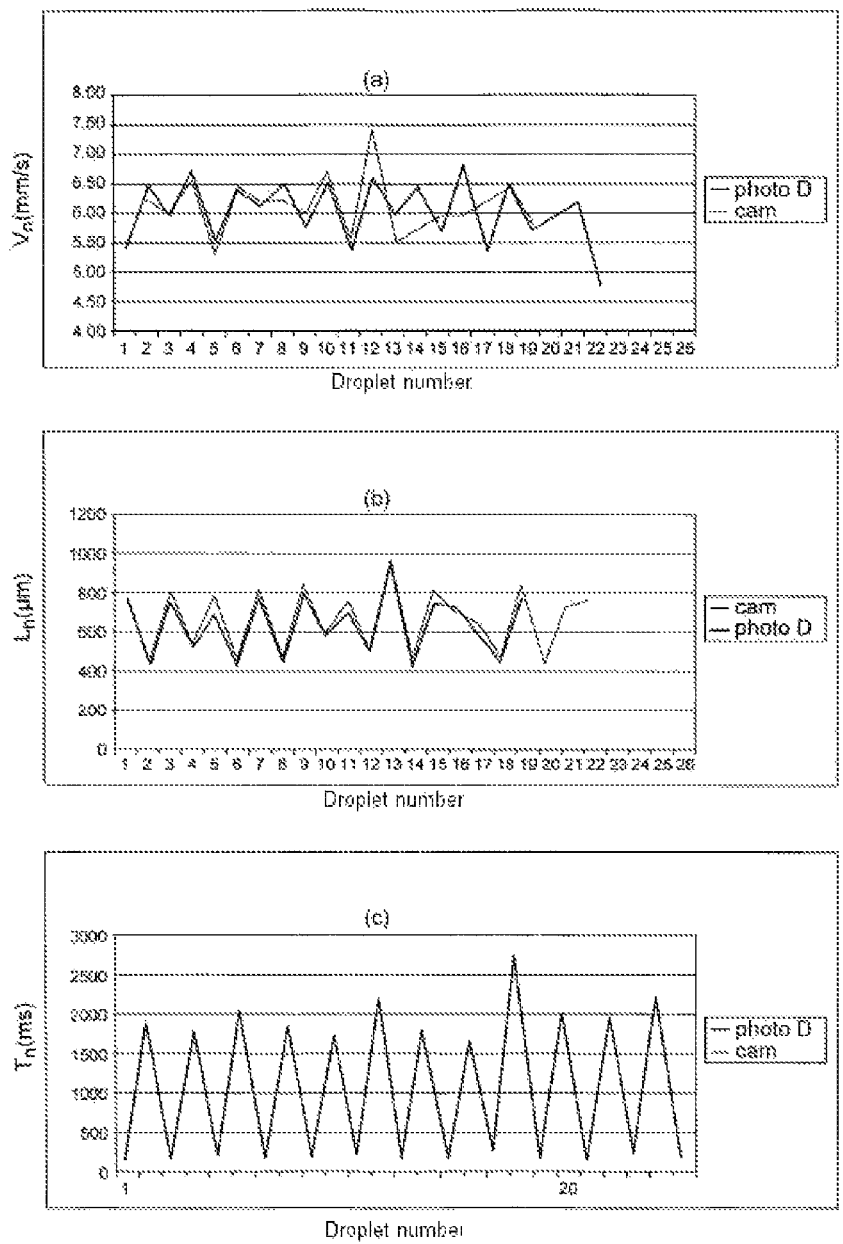
FIG. 7 shows experimental results obtained with the device of FIG. 1 for a flow of gas bubbles, in this case argon bubbles, in hexadecane for intermediate flow rates.

FIG. 7 shows experimental results obtained with the experimental device of FIG. 1 for a flow of argon bubbles in hexadecane.

The index difference between argon and hexadecane is 0.434. This difference is about 4 times greater than the index difference between a water droplet and hexadecane. As a result, the signal/noise ratio obtained with such differences is higher than the signal/noise ratio obtained with the flow of water droplets in hexadecane.

The gas flow rate and the hexadecane flow rate may be termed intermediate or moderately high flow rates. For example, the hexadecane flow rate was set at $Q_h$=7.5 μL/min.

It may be seen that there is a very good agreement between the measurements made by the camera 13 and by the photodiode detection means 12 according to the invention.

The higher index difference therefore makes characterization of the flow easier, this characterization remaining very good even at intermediate or high flow rates.

Figure 8:
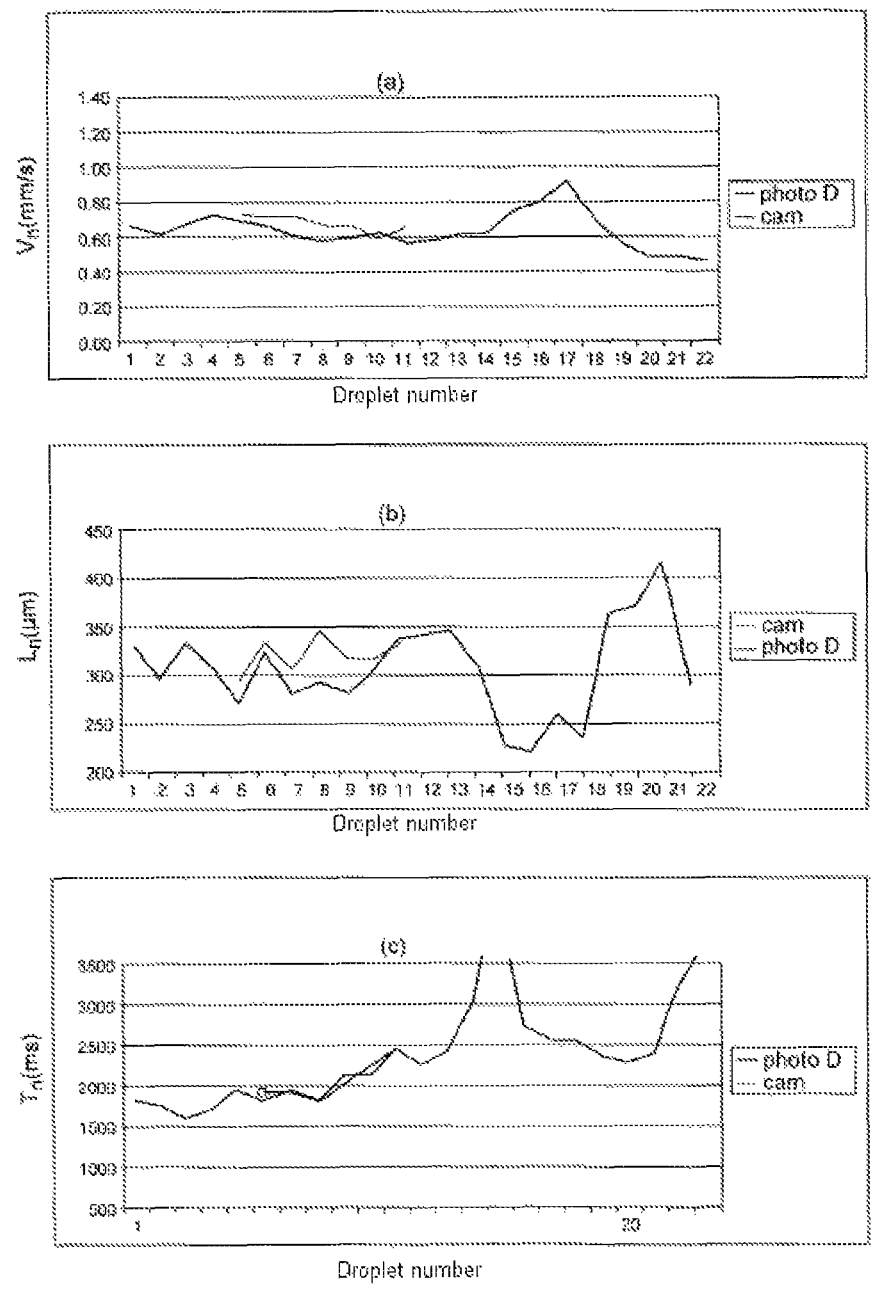
FIG. 8 shows experimental results obtained with the device of FIG. 1 for a flow of sweetened water droplets in hexadecane for low flow rates.

FIG. 8 shows experimental results obtained with the experimental device of FIG. 1 for a flow of sweetened water droplets in hexadecane.

The index difference between sweetened water and hexadecane is very small, about 0.008. As a result, the signal/noise ratio obtained with such a difference is much lower than the signal/noise ratio obtained with the flow of water droplets in hexadecane.

The sweetened water flow rate is set at $Q_e$=0.05 μL/min and the hexadecane flow rate at $Q_h$=0.2 μL/min. These flow rates may be termed low flow rates.

Despite a very low index difference, there is a good agreement between the results coming from the camera 13 ("cam") and those coming from the photodiode detection means 12 ("photoD"), both as regards the droplet velocity $V_n$ and the estimate of its length $L_n$ and the period $T_n$ between two successive droplets.

Figure 10:
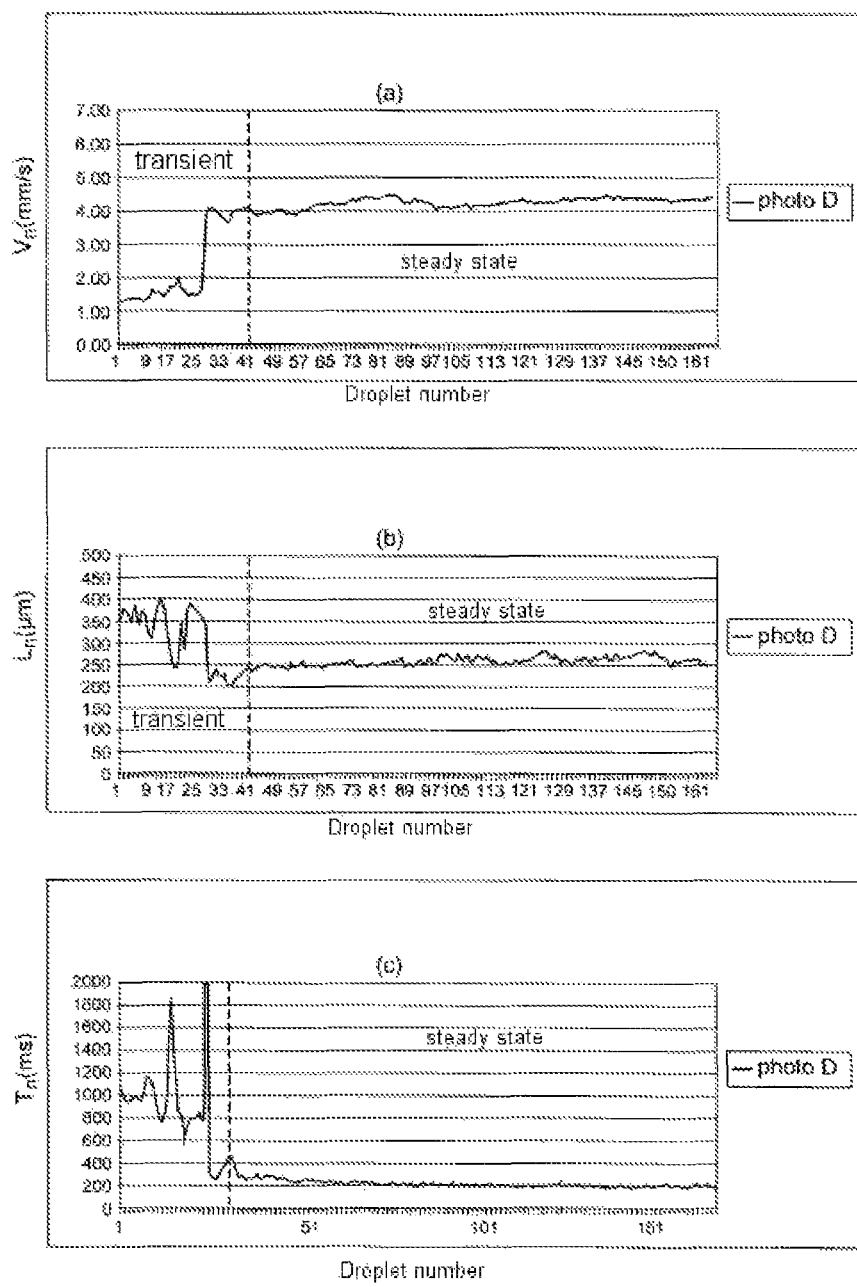
FIG. 10 shows the influence of a sudden increase in the flow rates on the characterization of a two-phase flow of water droplets in hexadecane, the increase taking place from a low flow rate to an intermediate flow rate.
Figure 11:
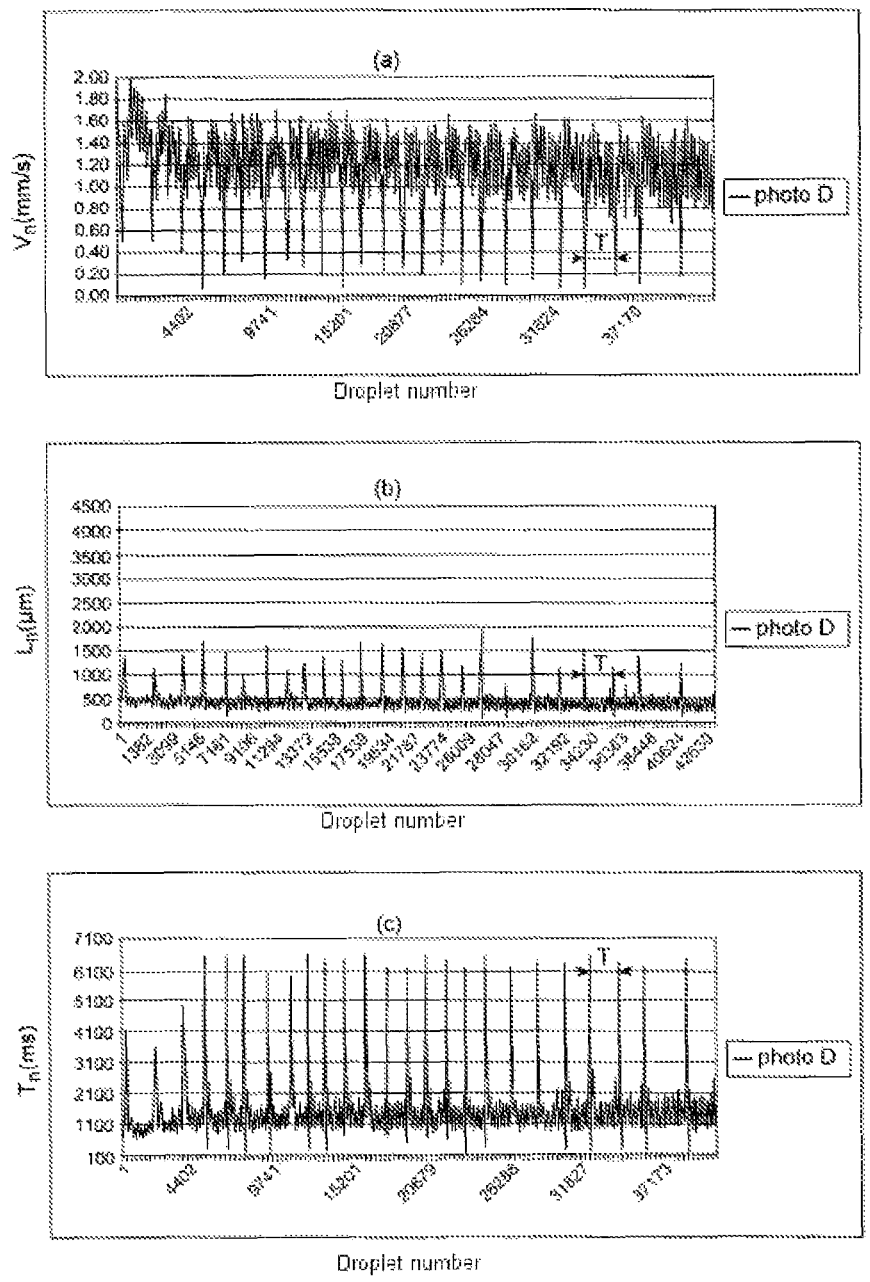
FIG. 11 shows the behavior of a flow of water droplets in hexadecane over very long acquisition times.

FIGS. 9 to 11 show measurements made by the device according to the invention which are either difficult to obtain using a high-speed video camera or quite simply are unobtainable using a high-speed camera.

FIG. 9 shows an output signal from the device of FIG. 1 obtained by the transit of a main water droplet 20 accompanied by a satellite water droplet 21 of smaller size in a hexadecane flow past the photodiode detection means 12 according to the invention.

FIG. 9 shows a first signal portion characteristic of the transit of a "short" water droplet past the photodiodes 121, 122 in accordance, for example, with the waveform of the signal shown in FIG. 2(b).

The second portion of the signal is an attenuated replica of the first portion of the signal which is representative of the transit of the satellite droplet 21 past the photodiodes 121, 122.

In this particular case, the satellite water droplet 21 has a size of about 25 μm. Since the signal obtained is completely interpretable for such a droplet size, the applicant estimates that the device according to the invention could identify and characterize droplets smaller in size than a few microns.

FIG. 10 shows the influence of a sudden increase in the flow rates on the characterization of a two-phase flow of water droplets in hexadecane carried out by the device of FIG. 1. The increase is from low flow rates, specifically $Q_e$=0.1 μL/min and $Q_h$=0.4 μL/min, to intermediate flow rates, namely $Q_e$=0.4 μL/min and $Q_h$=1.5 μL/min.

FIG. 10 is split into three diagrams (a), (b) and (c) respectively illustrating the water droplet velocity $V_n$, the water droplet length $L_n$ and the period $T_n$ separating two successive water droplets as a function of the droplet number.

Generally, applications in microfluidics are based on steady-state flows. However, optimization for a given application often requires a search for "good" flow rates. Consequently, the flow rates are varied so as to find "good" flow rates and the question of the wait time necessary for obtaining a new steady state following the modification of the flow rates becomes important.

The device according to the invention makes it possible to obtain in real time data from which it is easy to determine whether the flow is in a transient or a steady-state regime.

Finally, FIG. 11 shows the behavior of a flow of water droplets in hexadecane over very long acquisition times of the device of FIG. 1, for example from a few hours to an entire day.

FIG. 11 is split into three diagrams (a), (b) and (c) respectively illustrating the water droplet velocity $V_n$, the water droplet length $L_n$ and the period $T_n$ separating two successive water droplets as a function of the droplet number.

The water droplet and hexadecane flow rates are $Q_e$=0.1 μL/min and $Q_h$=0.4 μL/min respectively. These flow rates may be termed low flow rates.

FIG. 11 clearly demonstrates the advantage of being able to take measurements over very long times.

It may in fact be seen that there is a periodic behavior of the flow, with a period T, that it would not be possible to demonstrate with a known technique using a high-speed camera.

In the specific case here, this periodicity is probably due to the use of syringes 14, 15 as liquid reservoirs and more precisely to the associated syringe plungers.

Indeed, other tests were carried out with other types of syringe plunger (not shown) illustrating a drastic reduction of this effect. Moreover, tests (not shown) carried out by positioning the syringes 14, 15 open above the micro channel at defined heights (gravity effect and absence of syringe plungers) do not show any periodicity.

The results taken with the camera would therefore have been erroneous if the measurements made with this camera had been taken in the vicinity of a peak (the period T is defined between two successive peaks for all the signals shown in FIG. 11), without it being easy to identify the disturbance and/or its origin.

As mentioned earlier, the optical means 16 with a magnification serves to enlarge the droplet relative to the photodiodes 121, 122 in order to facilitate reading the voltage signal illustrated for example in FIG. 2(a), 2(b) or 3 in which the magnification is by a factor of 5.

When the droplets are small or when the spacing between two successive droplets is short, it is preferable to choose a higher magnification. In this situation, the magnification then makes it possible to ensure that the variations in illumination of the photodiodes 121, 122 are due to the transit of a single droplet at a time. This is because if two successive droplets have an influence at the same time on the illumination of one of the photodiodes, it then becomes more difficult to determine the influence of each droplet.

However, it is not known a priori what the droplet size will be, depending on the operating conditions of the device. Moreover, the spacing between the sensitive zones Z1, Z2 of the two photodiodes 121, 122 will preferably be fixed.

The applicant therefore wondered what the influence of the magnification factor is on the quality of the measurement.

A flow of water droplets in hexadecane, with water flow rates $Q_e$=0.1 μL/min and $Q_h$=0.4 μL/min, was therefore characterized with a number of magnification factors, namely 2.5, 5 and 10.

It was demonstrated that there was no influence of the magnification factor on the agreement between the results provided by the camera 13 and those provided by the photodiode detection means according to the invention.

However, the device according to the invention is subject to certain physical limitations.

Specifically, the device can analyze only a single droplet at a time. It therefore becomes inoperable if the droplets come into contact with one another or, more generally if two of them have an influence at the same time on the illumination of the photodiodes.

Moreover, although a high magnification does make data exploitation easier, for example in the case of droplets following one another very closely, the magnification must however not exceed a threshold value that depends on the spacing between the two photodiodes. Specifically, the applicant has tested a magnification factor of 20 for which it has been found that the width of the meniscus was close to the width of a photodiode 121, 122, making the data unusable.

The technique proposed in the context of the present invention has many advantages.

The device of the invention may be portable because of its compactness, thereby enabling it to be used on different sites.

Moreover, the measurement means employed (optical means, photodiodes, light source, etc.) are completely independent of the channel. In other words, the device is easily adaptable to various types of channel.

The optical means employed is very simple and widely used. It is for example an inverted microscope when it is desired to have a certain magnification.

The size of the acquisition files is small, allowing acquisition over long periods, and therefore allowing good statistical analysis to be carried out or enabling data to be obtained which is unobtainable using other techniques. This acquisition and the processing accompanying it may be carried out in real time.

Additionally, with this technique the refractive index difference between the two fluids is not a limiting parameter.

The invention claimed is:

1. A device for characterizing a two-phase flow in a channel comprising:
   a light source configured to illuminate the channel in which a fluid can flow in the form of a succession of droplets in another fluid;
   a means for detecting variations in illumination that are due to the transit of a droplet in the channel, said detection means comprising at least two photodiodes placed in series along the direction of the longitudinal axis of the channel so that a droplet in said succession of droplets flowing in the channel can cause the illumination detected by the first photodiode and then the illumination detected by the second photodiode to vary in succession, the photodiodes being connected in reverse so that the difference in current between the electrical currents output by each of the two photodiodes can be determined in order to obtain a differential current representative of the difference in the variation in illumination of the photodiodes; and a processing means for processing the data output by the detection means in order to deliver data characteristic of the two-phase flow.

2. The device for characterizing a two-phase flow in a channel as claimed in claim 1, in which an optical means placed between the channel and the photodiodes is provided.

3. The device for characterizing a two-phase flow in a channel as claimed in claim 2, in which the optical means is an optical magnification means.

4. The device for characterizing a two-phase flow in a channel as claimed in claim 1, in which the photodiodes are identical.

5. A device for characterizing a two-phase flow in a channel comprising:
a light source configured to illuminate the channel in which a fluid can flow in the form of a succession of droplets in another fluid;
a means for detecting variations in illumination that are due to the transit of a droplet in the channel, said detection means comprising at least two photodiodes placed in series along the direction of the longitudinal axis of the channel so that a droplet in said succession of droplets flowing in the channel can cause the illumination detected by the first photodiode and then the illumination detected by the second photodiode to vary in succession, the photodiodes being connected in reverse so that the difference in current between the electrical currents output by each of the two photodiodes can be determined in order to obtain a differential current representative of the difference in the variation in illumination of the photodiodes; and
a processing means for processing the data output by the detection means in order to deliver data characteristic of the two-phase flow comprising:
means for converting the differential current corresponding to the difference between the currents output by the photodiodes, which is between a few nanoamps and a few tens of nanoamps, into a voltage signal, for example a voltage between a few tens of millivolts and a few hundred millivolts; and
means for amplifying, for example by a factor of about 10, the voltage signal output by the current-voltage conversion means.

6. A device for characterizing a two-phase flow in a channel comprising:
a light source configured to illuminate the channel in which a fluid can flow in the form of a succession of droplets in another fluid;
a means for detecting variations in illumination that are due to the transit of a droplet in the channel, said detection means comprising at least two photodiodes placed in series along the direction of the longitudinal axis of the channel so that a droplet in said succession of droplets flowing in the channel can cause the illumination detected by the first photodiode and then the illumination detected by the second photodiode to vary in succession, the photodiodes being connected in reverse so that the difference in current between the electrical currents output by each of the two photodiodes can be determined in order to obtain a differential current representative of the difference in the variation in illumination of the photodiodes; and
a processing means for processing the data output by the detection means in order to deliver data characteristic of the two-phase flow in which the processing means comprises an analog/digital conversion means for converting a voltage signal thus representative of the variations in illumination due to the transit of a droplet in the channel in order to extract at least a transit time for this droplet between the photodiodes on the basis of thresholds dependent on at least one extremum (Min1, Max2) of said voltage signal.

7. The device for characterizing a two-phase flow in a channel as claimed in claim 1, which comprises means for supplying the channel with two immiscible fluids.

8. The device for characterizing a two-phase flow in a channel as claimed in claim 1, in which the detection means is placed downstream of the channel with reference to the direction of propagation of the light emitted by the light source.

9. A method of characterizing a two-phase flow in a channel comprising:
(a) at least one channel in which a fluid capable of flowing in the form of a succession of droplets in another fluid is illuminated;
(b) variations in illumination on a detection means, comprising at least two photodiodes placed in series along the direction of the longitudinal axis of the channel, are detected and the electrical currents output by each of the two photodiodes are subtracted in order to obtain a differential current representative of the difference in the variation in illumination of the two photodiodes; and
(c) the data from step (b) is processed in order to deliver the data characteristic of the two-phase flow.

10. A method of characterizing two-phase flow in a channel-comprising:
(a) at least one channel in which a fluid capable of flowing in the form of a succession of droplets in another fluid is illuminated;
(b) variations in illumination on a detection means, comprising at least two photodiodes placed in series along the direction of the longitudinal axis of the channel, are detected and the electrical currents output by each of the two photodiodes are subtracted in order to obtain a differential current representative of the difference in the variation in illumination of the two photodiodes; and
(c) the data from step (b) is processed in order to deliver the data characteristic of the two-phase flow, and wherein in which step (c) comprises steps for measuring a time interval associated with the transit of a droplet of the two-phase flow past the detection means, consisting in:
($c_1$) measuring the extrema (Min1, Max2) of a voltage signal representative of the change in the variations in illumination of the photodiodes which is obtained for a droplet preceding the droplet whose transit time it is desired to determine;
($c_2$) starting a time measurement when the value of the voltage signal obtained for the droplet that it is desired to characterize reaches a threshold ($T_{S11}$, $T_{S21}$, $T_{S22}$, $T_{S12}$) dependent on one of the extrema (Min1, Max2) measured for the preceding droplet; and
($c_3$) stopping this time measurement when the value of the voltage signal obtained for the droplet that it is desired to characterize reaches another threshold ($T_{S12}$, $T_{S22}$, $T_{S32}$) dependent on one of the extrema (Min1, Max2) measured for the preceding droplet.

11. The method of characterizing a two-phase flow in a channel as claimed in claim 10, in which steps are provided, for determining the velocity $V_n$ of the droplet, which consist in:

carrying out steps ($c_1$) to ($c_3$) for measuring the transit time of the droplet between the two photodiodes, in which:

step ($c_2$) consists in starting the measurement when the value of the voltage signal obtained for the droplet whose transit time between the two photodiodes it is desired to determine reaches a threshold called the third threshold ($T_{S21}$) dependent on the minimum Min1 measured for the preceding droplet and step ($c_3$) consists in stopping this measurement when the value of the voltage signal for the droplet whose transit time between the two photodiodes it is desired to determine reaches a threshold called the fourth threshold ($T_{S22}$) which is also dependent on the minimum Min1 measured for the preceding droplet; and calculating the velocity $V_n$ of the droplet by dividing the distance separating the two photodiodes by the transit time measured in the preceding step, this distance being optionally divided by the magnification factor of the optical magnification means when said means is employed.

12. The method of characterizing a two-phase flow in a channel as claimed in claim 10, in which steps are provided, for determining the velocity $V_n$ of the droplet, which consist in:

carrying out steps ($c_1$) to ($c_3$) for measuring the transit time of the droplet between the two photodiodes, in which:

step ($c_2$) consists in starting the measurement when the value of the voltage signal obtained for the droplet whose transit time it is desired to determine reaches a threshold called the second threshold ($T_{S12}$) dependent on the maximum Max2 measured for the preceding droplet and step ($c_3$) consists in stopping this measurement when the value of the voltage signal for the droplet whose transit time it is desired to determine reaches a threshold called the fifth threshold ($T_{S32}$) which is also dependent on the maximum Max2 measured for the preceding droplet; and calculating the velocity $V_n$ of the droplet by dividing the distance separating the two photodiodes by the transit time measured in the preceding step, this distance being optionally divided by the magnification factor of the optical magnification means when said means is employed.

13. The method of characterizing a two-phase flow in a channel as claimed in claim 11, in which steps are provided, for determining the length $L_n$ of the droplet, which consist in:

carrying out steps ($c_1$) to ($c_3$) for measuring a time interval $t_n$ associated with the length of the droplet, in which:

step ($c_2$) consists in starting the measurement when the value of the voltage signal obtained for the droplet whose transit time it is desired to determine reaches the fourth threshold ($T_{S22}$) and step ($c_3$) consists in stopping this measurement when the value of the voltage signal for the droplet whose transit time it is desired to determine reaches the fifth threshold ($T_{S32}$) and calculating the length $L_n$ of the droplet from the equation $L_n = t_n \times V_n - l_p$, where $t_n$ is the time interval measured in the preceding step, $V_n$, is the velocity of the droplet, measured beforehand, and $l_p$ is the width of a photodiode, optionally divided by the magnification factor of the optical magnification means when said means is employed.

14. The method of characterizing a two-phase flow in a channel as claimed in claim 11, in which steps are provided, for determining the length $L_n$ of the droplet, which consist in:

carrying out steps ($c_1$) to ($c_3$) for measuring a time interval $t_n$ associated with the length of the droplet, in which:

step ($c_2$) consists in starting the measurement when the value of the voltage signal obtained for the droplet whose transit time it is desired to determine reaches the fourth threshold ($T_{S22}$) and step ($c_3$) consists in stopping this measurement when the value of the voltage signal for the droplet whose transit time it is desired to determine reaches the second threshold ($T_{S12}$); and calculating the length Ln of the droplet from the equation $L_n = t_n \times V_n - (l_p - C)$, where $t_n$ is the time interval measured in the preceding step; $V_n$ is the velocity of the droplet, measured beforehand; $l_p$ is the width of a photodiode, optionally divided by the magnification factor of the optical magnification means when said means is employed; and C is a strictly positive corrective factor.

15. The method of characterizing a two-phase flow in a channel as claimed in claim 9, in which steps are provided that consist in:

converting the differential current obtained as output from the photodiodes into a voltage representative of the change in the illumination of these photodiodes; and amplifying said voltage.

* * * * *

UNITED STATES PATENT AND TRADEMARK OFFICE
CERTIFICATE OF CORRECTION

PATENT NO.        : 8,743,350 B2                                        Page 1 of 1
APPLICATION NO.   : 13/382104
DATED             : June 3, 2014
INVENTOR(S)       : Delville et al.

It is certified that error appears in the above-identified patent and that said Letters Patent is hereby corrected as shown below:

In the claims:

Column 20, Claim 10
Line 36, "characterizing two-phase flow" should read --characterizing a two-phase flow--.

Column 21, Claim 11
Line 19, "$V_n$of" should read --$V_n$ of--.

Column 22, Claim 13
Line 15, "$t_n$is" should read --$t_n$ is--.

Column 22, Claim 14
Line 36, "$V_n$is" should read --$V_n$ is--.

Signed and Sealed this
Seventh Day of October, 2014

Michelle K. Lee
*Deputy Director of the United States Patent and Trademark Office*